United States Patent 3,228,830
Jan. 11, 1966

3,228,830
BIOCIDALLY-ACTIVE PHENOXARSINE-CON-
TAINING POLYMERIC MATERIALS
Russell T. McFadden, Freeport, and Ralph R. Langner
and Lisby L. Wade, Lake Jackson, Tex., assignors to
The Dow Chemical Company, Midland, Mich., a corporation of Delaware
No Drawing. Filed Nov. 5, 1962, Ser. No. 235,520
29 Claims. (Cl. 167—42)

This invention relates to organic, polymeric latexes which have biocidal properties.

Phenoxarsine materials of themselves are known to be very toxic to aquatic plants when introduced in growth-inhibiting concentrations in the water environing the plants. It is further known that these phenoxarsine materials are very toxic to fungal plants and of lower toxicity to terrestrial plants, and may be applied to fungal organisms of their habitats in fungicidal amounts to obtain excellent controls of many fungal organisms which attack the seeds, roots or aboveground or aerial portions of terrestrial plants. Such practice protects the desirable plants or their seeds from the ravages of plant-attacking fungi and improves the crop yield, as well as the emergence and growth of seedlings without substantial injury to the crop plant or plant parts. Additionally, the compounds may be applied in dormant applications to the woody surfaces of terrestrial plants or to orchard floor surfaces to attain control of the overwintering spores of fungi.

Teachings concerning the above-described utilities of phenoxarsine materials are set forth in U.S. Letters Patent No. 3,069,252 issued December 18, 1962 to Melvin J. Josephs and John L. Hardy.

The physical properties of phenoxarsine compounds are such that their known utilities are limited. This is due to the limited solubility of phenoxarsines in aqueous and organic solvent systems. Phenoxarsines further tend to coagulate emulsion polymers, such as latexes.

Accordingly, it would be desirable and it is the principal object of the present invention to provide organic, ethenoid polymeric latexes and other organic ethenoid polymers having incorporated therein these biocidal phenoxarsines.

It is a resultant object of the present invention to provide biocidally-active, water-insoluble, organic, ethenoid polymeric latexes and other types of organic ethenoid polymers wherein the particular biocidal component and the polymerizable ethenoid monomeric components are polymerized to form unitary polymeric molecules.

A further object of the invention is to provide such biocidally-active, polymeric latexes that are adapted to be employed as film-forming coatings.

And still another object of the present invention is to provide such biocidally-active, water-insoluble, organic, ethenoid polymeric latexes in a form (1) which is capable of supporting substantial dilution without appreciable loss of cohesive binding power; (2) that possesses improved durability to out-of-door weathering; (3) that provides stable and non-precipitating emulsions; (4) that causes the biocidal component of the latex to wet and adhere to surfaces more tenaciously; and (5) that advantageously prolongs the residual activity of the biocidal component by means of a slow, steady releasing or exuding of the biocidally-active component from the filmaceous coating composed of a mass of adhesive, cohesive, biocidally-active ethenoid polymer latex molecules.

The biocidally-active, water-insoluble, organic ethenoid polymers of the invention are easily and efficiently produced by means of conventional polymerization methods employed for the preparation of various known, organic, polymeric latexes, as well as various suspension, solution and bulk polymers without detriment to the useful activity of the biocidal compound which is intimately combined in these ethenoid polymeric materials. Rather, it has been discovered that the inclusion of the phenoxarsine biocidal compounds contemplated within the scope of the present invention in the novel biocidally-active polymers have made possible the preparation of coating materials which possess substantially improved adhesion properties when coated onto a variety of substrates. In addition, these biocidally-active coating materials demonstrate significantly improved weatherability as well as beneficially prolonged biocidal activity.

The invention is, therefore, directed to biocidally-active, organic, ethenoid polymeric materials wherein at least one biocidal component, a phenoxarsine compound and at least one polymerizable ethenoid monomeric component are intermixed prior to emulsion, suspension, solution or bulk polymerizing of the latter.

By the expressions "biocidally-active component," "biologically-active compound," "bioactive compound," "biologically-active substance" and the like is meant those compounds or compositions known and used to inhibit, repel, exterminate or otherwise alter the normal activities of insects, molds, fungi, bacteria, protozoa, viruses, plants, invertebrates, worms and the like.

The group of biologically-active phenoxarsine-containing compounds which is found to be effective as biocidal components in the organic polymers of the invention may be selected from a diversified group of organic, ethenoid monomer-soluble derivatives of 10-phenoxarsine consisting of ethyl-(10-phenoxarsinyl)thiolacetate;
10-phenoxarsinyl ethylxanthate;
10-phenoxarsinyl-2-ethoxyethylxanthate;
10-phenoxarsinyl-sec.-amylxanthate;
S-(10-phenoxarsinyl)-4-acetoamidobenzenethiosulfonate;
S-(10-phenoxarsinyl)-4-methoxythiolbenzoate;
(10-phenoxarsinyl)tetrahydrofurfurylxanthate;
S-(10-phenoxarsinyl)-3,4,5-trimethoxythiolbenzoate;
(10-phenoxarsinyl)methylxanthate; and particularly
10-chlorophenoxarsine;
10-bromophenoxarsine;
10-phenoxarsinyl trichloroacetate;
(10-phenoxarsinyl)-n-octylxanthate;
10-methylphenoxarsine;
10-ethylphenoxarsine;
10-propylphenoxarsine;
10-butylphenoxarsine;
10-amylphenoxarsine;
10-phenylphenoxarsine;
S-(10-phenoxarsinyl)phenoxythiolacetate;
S-(10-phenoxarsinyl)-4-lauryloxythiolbenzoate;
S-(10-phenoxarsinyl)-thiolbenzoate;
(10-phenoxarsinyl)diisopropylphosphonate; and
10,10'-oxybisphenoxarsine.

The solubility in various polymerizable, organic ethenoid monomers of the above-described derivatives of 10-phenoxarsine is a readily discernible result of most elementary experimental practices performed routinely by even semi-skilled laboratory technicians.

10-chlorophenoxarsine and the substituted 10-chlorophenoxarsine compounds as employed in accordance with the present teachings may be prepared in known procedures from 2-nitrodiphenyl ether or a suitably substituted 2-nitrodiphenyl ether. The substituted ethers to be employed are those having chlorine and/or alkyl substituted on the ring moieties and having one ortho position unsubstituted on the ring moiety substituted with a nitro radical. In such procedures, the ether compound is treated with hydrochloric acid in the presence of tin or iron to reduce the nitro group to an amino group. The amino-substituted ether compound is then treated with hydrochloric acid and sodium nitrite to diazotize the amino group to a diazonium chloride group, and the diazotized product treated with sodium arsenite [As(ONa)$_3$] in a Bart reaction to produce the corresponding arsonate compound having an —AsO$_3$Na$_2$ group substituted for the diazonium chloride group. The arsonate derivative is then treated with hydrochloric acid and sulfur dioxide, whereby the arsonate group is reduced and chlorinated to the arsine dichloride group (—AsCl$_2$). This latter arsine dichloride product may then be heated at a temperature of about 200° C. and in the presence of a gaseous entraining agent, such as carbon dioxide or nitrogen, to bring about ring closure and the production of the desired 10-chlorophenoxarsine or substituted 10-chlorophenosarsine. Treatment of these products with potassium bromide gives the corresponding 10-halophenoxarsine or substituted 10-halophenoxarsines.

The 10,10'-oxybisphenoxarsine, as employed in accordance with the present teaching, may be prepared in known procedures by treating 10-chlorophenoxarsine with ammonium hydroxide in ethanol as reaction medium. The 10,10'-thiobisphenoxarsine, as herein employed, is also prepared by known procedures wherein 10-chlorophenoxarsine is reacted with hydrogen sulfide H$_2$S in a solvent, such as benzene.

Further details of the preparation of the above-mentioned 10-chlorophenoxarsine and the substituted 10-chlorophenoxarsine compounds are set forth by W. Lee Lewis et al., J.A.C.S., vol. 43, 891–896 (1921).

The S-(10-phenoxarsinyl) esters of the alkane dithioldicarboxylic acids, thiolalkanoic acids and substituted lower thiolalkanoic acids may be prepared by reacting 10,10'-oxybisphenoxarsine with an acid from the group consisting of the alkane dithioldicarboxylic acids, thiolalkanoic acids and substituted lower thiolalkanoic acids in which the substituents are selected from phenyl, halophenyl, halophenoxy, alkylphenyl, alkylphenoxy, alkoxyphenyl and alkoxyphenoxy.

The above-mentioned reaction is conveniently carried out in the presence of an inert organic liquid, such as benzene, toluene or xylene, as reaction medium. The amounts of the reagents to be employed are not critical, some of the desired ester products being obtained when employing any proportions of the reactants. In a preferred method of operation, good results are obtained when employing about one molecular proportion of the 10,10'-oxybisphenoxarsine with about two molecular proportions of the monocarboxylic acid reactants or with from about one to two molecular proportions of the dicarboxylic acid reactants. When employing the dicarboxylic acids, either a mono- or diester compound is obtained, depending upon whether 2 or 1 molecular proportion of the acid is employed. The reaction takes place readily at temperatures of from 15° to 175° C. with the production of the desired product and water of reaction. In carrying out the reaction, the 10,10'-oxybisphenoxarsine and acid reactant are mixed and contacted together in any convenient fashion and the resulting mixture thereafter heated for a short period of time to complete the reaction.

The 10-phenoxarsinyl esters of the present invention may be prepared by reacting 10-chlorophenoxarsine or 10-bromophenoxarsine with the alkali metal salt of an acid selected from the alkane dithioldicarboxylic acids, lower alkylxanthic acids, thioalkanoic acids and the substituted lower thiolalkanoic acids wherein the substituents are selected from phenyl, phenoxy, halophenyl, halophenoxy, alkylphenyl, alkylphenoxy, alkoxyphenyl and alkoxyphenoxy.

The preceding reaction is conveniently carried out in a liquid material as reaction medium, such as water, benzene or xylene. The exact amounts of the 10-halophenoxarsine and acid salt reagent to be employed are not critical. In a preferred mode of operation, about one molecular proportion of 10-halophenoxarsine is reacted with one molecular proportion of the mono salt of the acid reagents, or with about 0.5 molecular proportion of the di-salt of the dicarboxylic acids. This reaction takes place smoothly at temperatures of from 0° to 140° C. with the production of the desired product and alkali metal chloride of reaction. In carrying out the reaction, the 10-halophenoxarsine and alkali metal salt of the acid, such as the sodium or potassium salt, are mixed and contacted together in any convenient fashion and maintained for a period of time at a temperature of from 0° to 140° C. to complete the reaction. Following the reaction, the desired product may be separated by conventional procedures, such as washing with water, filtration and decantation, and recrystallization from common organic solvents.

Details of the preparation of S-(10-phenoxarsinyl) esters and 10-phenoxarsinyl esters employed in the preparation of the biocidally-active, organic, polymeric materials of the present invention are set forth in United States Letters Patent No. 3,038,921, issued June 12, 1962 to Stanley J. Strycker and Joseph E. Dunbar.

10-methylphenoxarsine and 10-phenylphenoxarsine, as employed in accordance with the teachings of the present invention, may be prepared by known methods as set forth by F. F. Blicke et al., J.A.C.S., vol. 60, 419–422 (1938) and Aeschlimann, J. Chem. Soc. 1927, 414 and 415. 10-methylphenoxarsine, accordingly, may be prepared by heating for about 2.5 hours 10-chlorophenoxarsine in benzene with magnesium methyl bromide dissolved in ethyl ether. 10-phenylphenoxarsine can be prepared by heating for about 4 hours the Grignard reagent prepared from bromobenzene with 10-chlorophenoxarsine.

Further, 10-phenoxarsinyl trichloroacetate, as employed in accordance with the present teachings, may be prepared by means of procedures wherein a solution of trichloroacetic acid in benzene is added to a warm solution of 10,10'-oxybisphenoxarsine in benzene while the latter is well stirred. Subsequently, the reaction mixture is boiled under reflux for approximately 45 minutes. Thereafter, benzene is evaporated in vacuo, leaving the crude product a light tan powder which may be subsequently recrystallized from nitromethane to give white, needle-like crystals. Another method of preparation is set forth in Japanese Patent No. 32–6400, issued August 17, 1932.

Also contemplated with the scope of the present invention is the use of S-(10-phenoxarsinyl)-4-acetoamidobenzenethiosulfonate. This compound may be prepared by adding a solution of 10-chlorophenoxarsine in dimethylformamide to a second solution of potassium p-acetoamidobenzenethiosulfonate in dimethylformamide. The reaction mixture is subsequently stirred and heated over a period of one-half hour at temperatures maintained within the range of from 80° C. to 100° C., during which time potassium chloride precipitates from the reaction mixture. Thereafter, the reaction mixture is cooled and poured into water. The resulting white powder precipitate is collected by filtration and recrystallized once from ethanol and twice from nitromethane to give the pure product as white, needle-like crystals.

(10-phenoxarsinyl) O,O-diisopropyl phosphonate, another derivative of 10-phenoxarsine, which is advantageously employed in the preparation of the biocidally-active, organic polymers of the invention may be satisfactorily prepared in accordance with the teachings of S. J. Strycker, as set forth in the copending application for U.S. Letters Patent, filed February 5, 1962, and having the Serial No. 171,254 now U.S. Patent 3,108,129. Therefore, (10-phenoxarsinyl) O,O-diisopropyl phosphonate is produced by means of the reaction of triisopropyl phosphite with 10-chlorophenoxarsine. The reaction mixture is maintained at a temperature of about 125° C. for a period of about 3 hours, during which time isopropyl chloride is evolved rather vigorously at first and gradually decreases as the reaction is continued. When the reaction is completed, the reaction mixture is reheated under vacuum to separate the last traces of isopropyl chloride and any unreacted triisopropyl phosphite. The desired product, (10-phenoxarsinyl) O,O-diisopropyl phosphonate, is obtained as a residue in the form of a white, waxy solid.

Two other 10-phenoxarsinyl derivatives of xanthic acid, namely, 10-phenoxarsinyl-2-ethoxyethylxanthate and 10-phenoxarsinyl tetrahydrofurfurylxanthate, likewise find utility in the preparation of the biocidally-active, organic polymers of the present invention. Both of the above-mentioned compounds are effectively produced by the gradual addition of either an aqueous solution of potassium 2-ethoxyethylxanthate or an aqueous solution of potassium tetrahydrofurfurylxanthate to separate solutions of 10-chlorophenoxarsine dissolved in acetone with vigorous stirring while maintaining the temperatures of the separate reaction mixtures, each within the range of from 15° to 20° C. The individual products of each of these reactions, after recrystallization, are obtained in the form of pale yellow, fluffy, needle-like crystals, (10-phenoxyarsinyl)-2-ethoxyethylxanthate having a melting point range of from 67 to 68.5° C. and (10-phenoxarsinyl)tetrahydrofurfurylxanthate having a melting point range of from 89.5° to 91.0° C.

The biocidally-active, organic, polymeric materials of the present invention can be prepared by employing known methods for polymerizing the monomers. Bulk, emulsion, suspension or solution methods may be used to effect polymerization of the biocide-monomer mixture. The monomer containing the biocidal material, in solution, emulsion, suspension or bulk, can be polymerized by the aid of heat and/or light in the presence or absence of polymerization catalyst at subatmospheric, atmospheric or superatmospheric pressure. Instead of using monomeric material, it is possible to start with partially polymerized materials or with biocide-monomer mixture and other partially polymerized monomeric materials. Another method of producing biocidally-active, polymeric materials is to mix the biocide-monomer mixture with a polymer, and bring about the further polymerization of the entire mass by the application of heat and/or light in the presence or absence of polymerization catalyst at subatmospheric, atmospheric or superatmospheric pressure. Nevertheless, the biocidally-active, organic polymers of the present invention are best prepared by employing emulsion methods for polymerizing the biocide-monomer mixture. However, it is an important feature of the invention that the phenoxarsine compound be incorporated into the reaction mixture containing at least one polymerizable ethylenically unsaturated monomer at a stage in the polymerization reaction before the monomer is converted by polymerization into the finally polymerized polymer, thereby insuring uniform and homogeneous distribution of the phenoxarsine biocide in the finally polymerized material.

The organic, ethenoid polymeric or ethenoid copolymeric component of the biocidally-active, phenoxarsine-containing polymers of the invention may be obtained from polymerizable olefinic compounds, such as $C_1$–$C_{18}$ primary and secondary alkyl esters of acrylic acid including methyl acrylate, ethyl acrylate, propyl- and isopropyl acrylates, butyl-, isobutyl- and sec.-butyl acrylates, amyl- and isoamyl acrylates, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate; glycidyl esters of monoethylenically unsaturated monocarboxylic acids, such as glycidyl acrylate; $C_1$–$C_{18}$ primary and secondary alkyl esters of methacrylic acid, such as methyl-, ethyl-, propyl-, isopropyl-, butyl-, isobutyl-, sec.-butyl methacrylates as well as n-amyl methacrylate, sec.-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate; diesters of alkylenediols with monoethylenically unsaturated monocarboxylic acids, such as ethylene dimethacrylate; acrylic acid; methacrylic acid; maleic acid; fumaric acid; crotonic acid; itaconic acid and esters thereof; acrylonitrile; methacrylonitrile; various monoalkenyl aromatic hydrocarbons of the benzene series characterized by the general formula:

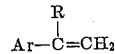

wherein Ar, selected independently, represents an aromatic hydrocarbon or a nuclear halohydrocarbon radical and R is hydrogen, a $C_1$–$C_4$ alkyl radical or halogen radical having an atomic number of from 17 to 35. Thus, the compounds represented by the formula may be styrene, α-methylstyrene, o-methylstyrene, p-methylstyrene, m-methylstyrene, ar-ethylstyrene, propylstyrenes, butylstyrenes, ar-chlorostyrene, ar-bromostyrene and the like. Other useful monomers include butadiene; as well as vinyl ester and ether monomers including vinyl acetate, vinyl propionate, vinyl butyrate, allyl glycidyl ether and the like; vinyl chloride and vinylidene chloride.

Since certain changes may be made in the above polymerizable ethenoid monomeric components and since different embodiments of the invention could be made without departing from the scope thereof, it is intended that all matter contained in the above description shall be interpreted as illustrative only and not in a limiting sense. Thus, the term "monomer" implies a single monomer or a mixture of two or more monomers, and the term "polymer" implies a homopolymer or a copolymer of two or more monomers.

An emulsifier is generally employed in emulsion and suspension polymerization practices, preferably in an amount in the range of from about 0.01 to about 10.0 percent based on monomer weight and may be of the anionic, cationic or nonionic type. While it is desirable to have an anionic emulsifier, it is not detrimental if a small amount, i.e., up to 10 percent, of a nonionic emulsifier is present or added after polymerization is complete. Appropriate emulsifying agents for present purposes include aryl sulfonates, alkali metal alkyl sulfates, alkyl naphthalene sulfonate, n-octadecyldisodium sulfosuccinate, di-t-butylphenoxy(polyethylene oxide)$_{40}$, sodium octylphenoxy(polyethylene oxide)sulfonate, isooctylphenyl polyethoxyethanol, nonylphenyl ether of nonaethylene glycol, sodium capryl phosphate, nonylphenyl ether of tetracontaethylene glycol, alkylphenyl ether of polyethylene glycol, an alkyl aryl sodium sulfonate, obtained as "Nacconol SD," the reaction product of one equivalent of nonylphenyl ether of triethylene glycol, 1.5 equivalents of the diglycidyl ether of 4,4'-isopropylidenediphenol having an epoxide equivalent weight within the range of from 172–178 and sodium hydrogen sulfite, etc. When greater than about 10 to 15 percent of the emulsifier is employed, there is usually no proportional increase in benefits and the resulting latex may have such a propensity to foam as to detract from its utility as a coating composition. The optimum amount of emulsifier and specific type can easily be determined by someone familiar with the field. When less than about 0.1 percent is employed, the stability of the latex, its utility as a coating type polymeric composition and other properties suffer adversely.

Suitable catalysts are the peroxides, e.g. benzoyl peroxide, phthaloyl peroxide, naphthoyl peroxide, substituted benzoyl peroxides, acetyl peroxide, caproyl peroxide, lauroyl peroxide, cinnamoyl peroxide, acetyl benzoyl peroxide, sodium peroxide, hydrogen peroxide, di-tert.-butyl peroxide, tert.-butyl hydroperoxide, tetralin peroxide, 1-hydroxy cyclohexyl hydroperoxide-1, urea peroxide, etc., the percompounds, e.g. sodium persulfate, ammonium persulfate, sodium perchlorate, sodium perborate, and potassium persulfate, etc., ozone, ozonides, etc., Lewis-acid type catalysts, e.g. aluminum chloride, stannic chloride, etc., metal compounds of unsaturated acids, such as, for instance, cobalt and manganese salts of linoleic acid, maleic acid, etc. The catalysts may be used alone or in admixture with one another. Any suitable amount of the catalyst or catalyst mixture may be used, but in general, the catalyst concentration that gives satisfactory results may be within the range of 0.1 to 0.4 percent by weight of the entire polymerizable mass.

The action of the catalysts may be enhanced by the use of suitable promoters or activators. A catalyst-promoter system can enable the polymerization to proceed at room temperature and bring about the polymerization of the entire mass in a much shorter time. A number of nitrogenous compounds, e.g. amines, especially aromatic and aliphatic tertiary amines, azo compounds, such as azoisobutyronitrile, etc.; aromatic sulfinic acids, certain sulfites like sodium bisulfite, dibutyl sulfite, etc.; long chain aliphatic mercaptans, e.g. dodecyl mercaptan, mixed tertiary mercaptans, etc., are capable of promoting the action of catalysts like peroxides, percompounds like persulfates, etc. and bring about the polymerization at room temperature. The time required for such a polymerization will depend on the nature and amounts of the catalyst and promoter employed. In polymerizations of this type, it may be desirable to employ polymer or copolymer along with the monomer mixture. Polymerization conditions may further be modified by the application of heat, light or heat and light, cooling at atmospheric, subatmospheric and superatmospheric pressure.

In accordance with the practice for preparing the biocidally-active, organic ethenoid polymers of the present invention, a monomer-biocide solution is prepared, said solution being comprised of from about 0.0001 to about 5 weight percent, and preferably from about 0.1 to about 2.5 weight percent, of (A) at least one biocidally-active, organic, monomer-soluble derivative of 10-phenoxarsine selected from the group consisting of (10-phenoxarsinyl)ethylthiolacetate;
(10-phenoxyarsinyl)ethylxanthate;
(10-phenoxarsinyl)-2-ethoxyethylxanthate;
(10-phenoxarsinyl)-sec.-amylxanthate;
S-(10-phenoxarsinyl)-4-acetoamidobenzenethiosulfonate;
S-(10-phenoxarsinyl)-4-methoxythiolbenzoate;
(10-phenoxarsinyl)tetrahydrofurfurylxanthate;
S-(10-phenoxarsinyl)-3,4,5-trimethoxythiolbenzoate;
(10-phenoxarsinyl)methylxanthate;

and particularly 10-chlorophenoxarsine;
10-bromophenoxarsine;
(10-phenoxarsinyl)diisopropylphosphonate;
10,10'-oxybisphenoxarsine;
(10-phenoxarsinyl)trichloroacetate;
(10-phenoxarsinyl)-n-octylxanthate;
10-methylphenoxarsine;
10-ethylphenoxarsine;
10-propylphenoxarsine;
10-butylphenoxarsine;
10-amylphenoxarsine;
10-phenylphenoxarsine;
S-(10-phenoxarsinyl)phenoxythiolacetate;
S-(10-phenoxarsinyl)-4-lauryloxythiolbenzoate; and
S-(10-phenoxarsinyl)thiolbenzoate;

and at least 95, and preferably from about 97.5 to about 99.9 weight percent of (B) at least one polymerizable olefinically unsaturated monomer selected from the group consisting of (I) $C_1$-$C_{18}$ primary and secondary alkyl esters of acrylic acid; (II) glycidyl esters of monoethylenically unsaturated aliphatic monocarboxylic acids; (III) $C_1$-$C_{18}$ primary and secondary alkyl esters of methacrylic acid; (IV) diesters of alkylenediols with monoethylenically unsaturated aliphatic monocarboxylic acids; (V) acrylonitrile; (VI) methacrylonitrile; (VII) mono- alkenyl aromatic hydrocarbons of the benzene series represented by the general formula:

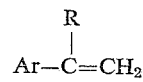

wherein Ar, selected independently, represents an aromatic hydrocarbon radical and a nuclear halohydrocarbon radical and R is hydrogen, a $C_1$-$C_4$ alkyl radical and a halogen radical having an atomic number of from 17 to 35; (VIII) open-chain aliphatic conjugated dienes having from 4 to 9 carbon atoms, such as butadiene, isoprene and the like; (IX) vinyl esters of monocarboxylic organic aliphatic acids having from 2 to 4 carbon atoms in the acid substituent group; (X) allyl glycidyl ether; (XI) vinyl chloride; (XII) vinylidene chloride; and (XIII) an $\alpha,\beta$-monoethylenically unsaturated aliphatic carboxylic acid.

A second solution is prepared by dissolving a catalyst and an emulsifier, as described herein, in a suitable volume of water. The amount of water is not critical and will be in the order of from about 1 to 1½ times by weight of the amount of monomer-biocide solution. The second solution is heated and the monomer-biocide solution is added thereto portionwise while maintaining the temperature of the reaction in the range of from about 35° to about 85° C., depending on the specific catalyst used, under autogenous pressure of from about atmospheric to about 150 p.s.i. The resulting polymeric latexes prepared in this manner will, upon completion of the polymerization reaction, contain from about 20 to about 75, and preferably from about 45 to about 55, weight percent non-volatiles at 140° C. and will have a biocide content of from about 1 p.p.m. to about 5 weight percent as based on the total weight of non-volatile latex solids.

When bulk or solution polymerization techniques are used to produce the new biocidally-active, organic, polymeric materials of the invention, one or more polymerization promoting and sustaining catalysts can be suitably admixed with the biocide-monomer solution prior to or after introducing the solution of reactants into the polymerization reactor. Also, if solution polymerization methods are employed, in addition to a catalytic agent, it is customary to include as the reaction medium, one or more inert organic solvents which are known to be miscible with the reactants. Frequently, the solvent reaction medium is also a suitable solvent for the reaction-formed polymeric product. The organic solvent solution of the new and useful biocidally-active, polymeric products may thus be employed as a coating per se; they may have suitable filler, pigments and other paint additives incorporated therein; or these polymer solutions can be employed as intermediates which may be further reacted with suitable crosslinking materials to produce other valuable plastic products. Suitable inert, organic solvents for present purposes may include various alkanols containing from 1 to 10 carbon atoms, toluene, xylene, benzene, high boiling petroleum liquids, etc.

The range of polymerization temperatures to be employed in accordance with the four different polymerization techniques practiced herein to insure the production of a satisfactory biocidally-active polymer product in each instance is governed as to upper limit by (a) the temperature at which the polymer depolymerization rate commences to exceed the polymer formation or polymerization rate; or (b) the temperature at which the stability of the biocidal component in the polymerizable monomeric mixture is threatened. A satisfactory lower temperature limit is determined by (c) determining the polymerization initiation and polymerization propagation temperatures required by the various monomer or monomers being polymerized; or (d) determining the approximate temperature at which dissolution of the various generally solid biocidal components in the various polymerizable monomers can be accomplished.

The following examples are merely illustrative of the practices suitable for preparing the biocidally-active, phenoxarsine-containing polymers of the present invention and are not to be construed as limiting the scope of the invention.

EXAMPLE I

Into a reaction vessel equipped with means for stirring, temperature control, refluxing and purging were introduced 208 grams of distilled water and 26 grams of sodium octylphenoxy(polyethyleneoxy)sulfonate. The vessel was purged with nitrogen and thereafter the temperature of this aqueous solution was raised to 85° C. while the aqueous solution was stirred. One-half gram of sodium persulfate dissolved in 50 milliliters of water was added to the contents of the reaction vessel. Subsequently, a biocide-monomer solution, composed of 134 grams of ethyl acrylate, 66 grams of methyl methacrylate, 2.0 grams of methacrylic acid, 1.0 gram of acrylic acid and 0.5 gram of 10-chlorophenoxarsine, was added portionwise to the above-described aqueous phase. Completion of the biocide-monomer solution addition was accomplished over a period of 90 minutes. Thereafter, the temperature of the polymerization mixture was maintained at about 83° C. for an additional 90 minutes.

The emulsion polymer product, thus obtained, contained about 47 weight percent of non-volatile solids, of which by analysis 0.2 weight percent was composed of 10-chlorophenoxarsine and 99.8 weight percent was composed of the ethyl acrylate/methyl methacrylate/methacrylic acid/acrylic acid interpolymer having an approximate percentage weight ratio of 66:32:1:0.5, respectively. Dried films cast of the biocidally-active, polymeric latex product were soft, tacky and transparent which indicated excellent compatibility of the polymer and biocidal components. It was noted that further dilution of the latex product to any concentration with water did not affect the stability of the latex emulsion. In addition, the latex emulsion demonstrated satisfactory stability in the presence of aqueous polyvalent metal salt solutions, and it also showed very good freeze-thaw stability.

Shelf life stability of the biocide-polymer latex product was determined by diluting 1 part of the product with 100 parts of water. No settling out of the non-volatile solids content of the diluted latex occurred in a period of 30 days.

It is generally appreciated that aqueous dispersions of polymerized acrylate interpolymer latex coating and paint formulations that are normally susceptible to contamination by bacteria cannot be satisfactorily stored without formulating the same with a bacteriocidal compound prior to storage. This bacteria-resistant, polymeric latex prepared according to the practice and recipe set forth above, is advantageously and satisfactorily rendered resistant to bacterial contamination by the presence therein of as little as 0.2 weight percent of 10-chlorophenoxarsine.

EXAMPLES II—XVIII

Employing the conventional emulsion polymerization practice of Example I, seventeen additional and different biocides were, in turn, individually admixed into separate batches of the same combination of polymerizable organic monomers as employed in Example I. The addition of enough of each biocide to the individual batches of the same monomeric mixture was performed in each instance prior to the emulsion polymerization of the biocide-monomer mixture thus prepared. In each of the polymerization Runs I–XVII, a sufficient amount of biocide was added to the polymerizable organic monomers to provide a biocide-quaternary interpolymer latex product containing a 1.0 percent concentration of biocide in the latex as based on the total weight of the resultant quaternary interpolymer latex formed. Table I, shown hereinafter, indentifies (1) the individual polymerization reactions as Runs I through XVII; (2) the seventeen different biocidal constituents; and (3) pertinent remarks with regard to the quality and speed of reaction as observed during the individual polymerizations.

*Table I*

| Run No. | Biocidal Component | Remarks |
|---|---|---|
| I | 10-phenoxarsinyl trichloroacetate | Good reaction, good rate. |
| II | (10-phenoxarsinyl)-n-oxtylxanthate | Do. |
| III | 10-methylphenoxarsine | Do. |
| IV | 10-phenylphenoxarsine | Do. |
| V | S-(10-phenoxarsinyl)phenoxythiolacetate | Do. |
| VI | S-(10-phenoxarsinyl)-4-lauryloxythiolbenzoate. | Do. |
| VII | S-(10-phenoxarsinyl)thiolbenzoate | Do. |
| VIII | (10-phexoxarsinyl)-diisopropylphosphonate. | Do. |
| IX | Ethyl-(10-phenoxarsinyl)thiolacetate | Good reaction, slower rate. |
| X | 10-phenoxarsinyl ethylxanthate | Do. |
| XI | 10-phenoxarsinyl-2-ethoxyethylxanthate | Do. |
| XII | 10-phenoxarsinyl-sec.-amylxanthate | Do. |
| XIII | S-(10-phenoxarsinyl)-4-acetoamidobenzenethiosulfonate. | Do. |
| XIV | S-(10-phenoxarsinyl)-4-methoxythiolbenzoate. | Do. |
| XV | (10-phenoxarsinyl)tetrahydrofurfurylxanthate. | Do. |
| XVI | S-(10-phenoxarsinyl)-3,4,5-trimethoxythiolbenzoate. | Do. |
| XVII | (10-phenoxarsinyl)methylxanthate | Do. |

EXAMPLES XIX AND XX

By means of the previously described conventional emulsion polymerization practices of Example I, two more biocidally-active, organic, polymeric latexes were prepared by admixing (A) about 5.0 weight percent of 10,10'-oxybisphenoxarsine with a monomeric mixture composed of about 90 weight percent of butyl acrylate and about 5.0 weight percent of acrylic acid; and (B) about 1 p.p.m. of 10,10'-oxybisphenoxarsine with a monomeric mixture composed of about 25 weight percent of styrene and about 75 weight percent of butadiene. Subsequently, the biocide-comonomer mixture A and the biocide-comonomer mixture B were each in turn polymerized. The biocidally-active butyl acrylate-acrylic acid copolymer latex containing about 5.0 weight percent of 10,10'-oxybisphenoxarsine as based on the total weight of latex solids was found to be effective as a fungicide. The other biocidally-active styrene/butadiene copolymer latex containing about 1 p.p.m. of 10,10'-oxybisphenoxarsine as based on the total weight of latex solids was, by comparison, found to be satisfactory as a bacteriostatically-active copolymer latex.

The variation in concentration of biocide is dictated principally by the ultimate intended application of each of the biocidally-active, organic, polymeric latex products and not to any appreciable extent by any tendency of the various biocidal compounds to cause undesirable instability of the polymeric latex components.

EXAMPLE XXI

| | G. |
|---|---|
| Oil phase: | |
| Vinyl acetate | 400 |
| (10-phenoxarsinyl)-diisopropylphosphonate | 0.4 |
| Water phase: | |
| Water | 426 |
| "Cellosize WP-09" [a] | 4.4 |
| "Nacconol SD" [b] | 9.2 |
| "Triton X-100" [c] | 8.0 |
| "Tergitol NP-14" [d] | 1.6 |
| "Triton X-200" [e] | 1.6 |
| Sodium carbonate | 1.6 |
| Sodium persulfate | 1.6 |

[a] "Cellosize WP-09" is a 5.0 weight percent aqueous solution of dihydroxy ethyl cellulose having a viscosity at 25° C. of from 70–110 centipoises.
[b] "Nacconol SD" is an alkyl aryl sodium sulfonate.
[c] "Triton X-100" is isooctylphenyl polyethoxy ethanol.
[d] "Tergitol NP-14" is an alkyl phenyl ether of polyethylene glycol.
[e] "Triton X-200" is sodium octylphenoxy(polyethylene glycol)sulfonate.

Into a reaction vessel, equipped with a means for stirring, temperature control and refluxing, was placed the water charged and the temperature was raised to 50° C. Into this, 50 ml. of monomer was added quickly. Heating was continued until the temperature reached 80° C., at which time the feed was resumed and continued for approximately 1½ to 2 hours until the entire amount of the monomer phase had been added. Heating was continued until the temperature reached 90° C. and the reaction mixture was held thereat for 20 minutes. The latex contained 47.7 percent solids.

EXAMPLE XXII

Oil phase: | G.
--- | ---
Isobutyl acrylate | 20
Vinyl acetate | 24
Acrylic acid | 1.0
10-phenoxarsinyl trichloroacetate | .025
Water phase: |
Water | 52
TOP–C a | 1.7
Nonylphenyl ether of tetracontaethylene glycol | 1.5
Trisodium phosphate | 0.20
Potassium persulfate | 0.15
Sodium bisulfite | 0.17 a TOP–C is the reaction product of one equivalent of nonylphenyl ether of triethylene glycol, 1.5 equivalents of the diglycidyl ether of 4,4-isopropylidene diphenol having an epoxide equivalent weight within the range of from 172–178, and sodium hydrogen sulfite (NaHSO₃).

The entire list of the above ingredients, with the exception of the sodium bisulfite, was loaded into a citrate bottle and frozen solid. Upon freezing, the dry bisulfite was weighed into the bottle and the bottle was capped and placed on a heavily shielded magnetic stirrer at room temperature for 48 hours. The latex was smooth and had a 40 percent solids content.

EXAMPLE XXIII

Water phase: | G.
--- | ---
Water | 52
TOP–C a | 1.7
Nonylphenyl ether of tetracontaethylene glycol | 1.5
Trisodium phosphate | 0.2
Potassium persulfate | 0.15
Oil phase: |
Isobutyl acrylate | 24
Vinylidene chloride | 24
Acrylic acid | 1.0
10-phenylphenoxarsine | 0.49 a See Example XXII, footnote a.

The procedure was the same as in Example XXII with the exception that no sodium bisulfite was used and the polymerization was run for 4 hours at 75° C.

EXAMPLE XXIV

| | |
--- | ---
Butadiene | g-- 32
Styrene | g-- 11
10-chlorophenoxarsine | p.p.m.-- 1
Mixed tertiary mercaptan | g-- 0.21
Water | g-- 75
Sodium persulfate | g-- 0.13
Ivory soap | g-- 2.1

The entire recipe, with the exception of the butadiene, was loaded into a citrate bottle and frozen. The butadiene was then weighed into the frozen contents of the bottle and the bottle was capped. The mixture was tumbled for 18 hours at 50° C. The latex thus produced was smooth and odorless and had a 36 percent solids content.

EXAMPLE XXV

A mass polymer was prepared as follows:

| | G. |
--- | ---
Styrene | 60
2-ethylhexyl acrylate | 18.3
Glycidyl acrylate | 9.1
Allyl glycidyl ether | 13.0
Ditertiary butyl peroxide | 0.4
(10-phenoxarsinyl)diisopropylphosphonate | 0.1

The reactants were placed in a citrate bottle, sealed and put in a magnetically stirred bath at 135° C. for 24 hours. At the end of this time, a very viscous, gummy resin with a light odor was obtained.

EXAMPLE XXVI

Solution polymer—

Monomer mix: | G.
--- | ---
Ethyl acrylate | 300
Methyl methacrylate | 150
Acrylic acid | 50
(10-phenoxarsinyl)diisopropylphosphonate | 0.5
Solvent mix: |
Ethanol | 550
Mixed tertiary mercaptans | 5.0
Benzoyl peroxide | 5.0

The solvent mix was placed into a reaction vessel, equipped with a means for stirring, temperature control and refluxing, and 100 ml. of the monomer mix was introduced. This mixture was heated to 65° C. and maintained thereat while the remainder of the monomer mix was added dropwise over a period of approximately 1½ hours. Upon completion of the monomer addition, the mixture was digested at 80° C. for one hour. When cooled, the composition was clear, colorless and had a 47 percent solids content. Films cast from it were clear and homogeneous. These films, when baked with aminoplasts, were suitable as coatings.

EXAMPLE XXVII

The following experiment illustrates the suspension polymerization technique.

Into a reaction vessel, equipped with a means for stirring, temperature control and refluxing, were placed 100 g. of 2 percent water solution as the ammonium salt of acrylic acid. To this was added a solution consisting of 100 g. of xylene, 24 g. of ethylene dimethacrylate, 288 g. of styrene, 288 g. of acrylonitrile, 6 g. of azoisobutyronitrile and 33 g. of 10,10′-oxybisphenoxarsine. The mixture was stirred 4 hours at 65° C. The polymers thus produced were separated and dried into discrete spherical particles that could be molded into various shapes with heat. Such polymers, when placed on a nutrient agar plate, demonstrated a zone of inhibition to bacteria.

What is claimed is:

1. An aqueous dispersion of a latex of a biocidally-active, water-insoluble, organic, polymeric composition comprised of from about 20 to about 75 weight percent of non-volatile solids consisting of the individual particles of said latex, said particles being composed essentially of from about 0.0001 to about 5.0 weight percent of (A) a biocidally-active, organic, ethenoil monomer-soluble phenoxarsine-containing compound selected from the group consisting of 10-chlorophenoxarsine,
10-bromophenoxarsine,
10-methylphenoxarsine,
10-ethylphenoxarsine,
10-proplyphenoxarsine,
10-butylphenoxsarine,
10-amylphenoxarsine,
10-phenylphenoxarsine,
10,10′-oxybisphenoxarsine,
(10-phenoxarsinyl)trichloroacetate,
(10-phenoxarsinyl)-n-octylxanthate,
S-(10-phenoxarsinyl)phenoxythiolacetate,
S-(10-phenoxarsinyl)thiolbenzoate,
S-(10-phenoxarsinyl)-4-lauryloxythiolbenzoate,
(10-phenoxarsinyl)diisopropylphosphonate, (10-phenoxarsinyl)ethylthiolacetate,
S-(10-phenoxarsinyl)-4-methoxythiolbenzoate,
S-(10-phenoxarsinyl)-3,4,5-trimethoxythiolbenzoate,
S-(10-phenoxarsinyl)-4-acetoamidobenzenethiosulfonate,
(10-phenoxarsinyl)methylxanthate,
(10-phenoxarsinyl)ethylxanthate,
(10-phenoxarsinyl)-2-ethoxyethylxanthate,
(10-phenoxarsinyl)-sec.-amylxanthate, and
(10-phenoxarsinyl)tetrahydrofurfurylxanthate, and at least 95 weight percent of (B) an ethenoid polymeric material composed of at least one polymerized monomeric olefinically unsaturated compound.

2. An aqueous dispersion of a latex of a biocidally-active, water-insoluble, organic, polymeric material comprised of 20 to 75 weight percent non-volatile solids consisting of the individual particles of said latex, said particles being composed essentially of from 0.0001 to about 5.0 weight percent of (A) an ethenoid monomer-soluble phenoxarsine compound selected from the group consisting of 10-chlorophenoxarsine,
10-bromophenoxarsine,
10-methylphenoxarsine,
10-ethylphenoxarsine,
10-propylphenoxarsine,
10-butylphenoxarsine,
10-amylphenoxarsine,
10-phenylphenoxarsine,
10,10'-oxybisphenoxarsine,
(10-phenoxarsinyl)trichloroacetate,
(10-phenoxarsinyl)-n-octylxanthate,
S-(10-phenoxarsinyl)phenoxythiolacetate,
S-(10-phenoxarsinyl)thiolbenzoate,
S-(10-phenoxarsinyl)-4-lauryloxythiolbenzoate,
(10-phenoxarsinyl)diisopropylphosphonate,
(10-phenoxarsinyl)ethylthiolacetate,
S-(10-phenoxarsinyl)-4-methoxythiolbenzoate,
S-(10-phenoxarsinyl)-3,4,5-trimethoxythiolbenzoate,
S-(10-phenoxarsinyl)-4-acetoamidobenzenethiosulfonate,
(10-phenoxarsinyl)methylxanthate,
(10-phenoxarsinyl)ethylxanthate,
(10-phenoxarsinyl)-2-ethoxyethylxanthate,
(10-phenoxarsinyl)-sec.-amylxanthate, and
(10-phenoxarsinyl)tetrahydrofurfurylxanthate, and at least 95 weight percent of (B) an ethenoid polymeric material composed of at least one polymerized monomeric olefinically unsaturated compound selected from the group consisting of (I) alkyl esters of acrylic acid wherein the alkyl is a member of the group consisting of primary and secondary alkyl containing 1–18 carbons; (II) glycidyl esters of monoethylenically unsaturated aliphatic monocarboxylic acids; (III) alkyl esters of methacrylic acid wherein the alkyl is a member of the group consisting of primary and secondary alkyl containing 1–18 carbons; (IV) diesters of alkylenediols with monoethylenically unsaturated aliphatic monocarboxylic acids; (V) acrylonitrile; (VI) methacrylonitrile; (VII) monovinyl aromatic hydrocarbon of the benzene series represented by the formula:

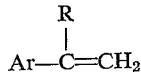

wherein Ar represents a member of the group consisting of aryl and haloaryl and R is a member of the group consisting of hydrogen, $C_1$–$C_4$ alkyl, and halogen having an atomic number of from 17 to 35; (VIII) open-chain aliphatic conjugated dienes having from 4 to 9 carbons; (IX) vinyl esters of monocarboxylic organic aliphatic acids having from 2 to 4 carbons in the acid substituent group; (X) allyl glycidyl ether; (XI) vinyl chloride; (XII) vinylidene chloride and (XIII) α,β-monoethylenically unsaturated aliphatic carboxylic acid, the total compositional weight of components A and B being equal to 100 weight percent.

3. A fungicidally-active coating composition comprised of an aqueous dispersion containing from about 45 to about 50 weight percent of non-volatile solids of a biocidally-active, film-forming, organic, ethenoid polymeric latex, the individual latex particles being composed essentially of an admixture of about 5.0 weight percent of 10,10'-oxybisphenoxarsine uniformly dispersed in an ethenoid copolymer composed of about 90 weight percent of butyl acrylate and about 5.0 weight percent of acrylic acid, the total compositional weight of said particles of said biocidally-active latex being based on 100 weight percent.

4. A biocidally-active, water-insoluble, organic polymeric latex adapted to be employed as a bactericide, the individual particles of which are composed essentially of a uniform admixture of about 0.0001 (1 p.p.m.) weight percent of 10,10'-oxybisphenoxarsine, about 25 weight percent of copolymerized styrene and about 75 weight percent of copolymerized butadiene, the total compositional weight of the particles of said biocidally-active latex being based on 100 weight percent.

5. A biocidally-active, water-insoluble, organic, polymeric latex comprised of an aqueous dispersion containing about 47.7 weight percent of non-volatile solids consisting of the individual particles of said latex, said particles being composed essentially of an admixture of about 0.1 weight percent of (10-phenoxarsinyl)diisopropylphosphonate uniformly dispersed in polyvinyl acetate, the total compositional weight of said particles of said biocidally-active latex being based on 100 weight percent.

6. A biocidally-active, water-insoluble, organic, polymeric latex comprised of an aqueous dispersion containing about 40 weight percent of non-volatile solids consisting of the individual particles of said latex, said particles being composed essentially of an admixture composed of about .00055 weight percent of 10-phenoxyarsinyltrichloroacetate uniformly dispersed in ternary interpolymer composed of about 3.0 weight percent of acrylic acid, about 44 weight percent of isobutyl acrylate and about 53 weight percent of vinyl acetate, the total compositional weight of said particles of said biocidally-active latex being based on 100 weight percent.

7. A biocidally-active, water-insoluble, organic, polymeric latex comprising about 1.0 weight percent of 10-phenylphenoxarsine uniformly dispersed in the individual particles of a ternary interpolymer latex, said interpolymer composed of about 49 weight percent of isobutyl acrylate, about 48 weight percent of vinylidene chloride and about 2.0 weight percent of acrylic acid, the total compositional weight of said particles of said biocidally-active latex being based on 100 weight percent.

8. A biocidally-active, water-insoluble, organic, polymeric latex comprised of an aqueous dispersion containing about 36 weight percent of non-volatile solids consisting of the individual particles of said latex, said particles being composed essentially of an admixture composed of 0.0001 weight percent of 10-chlorophenoxarsine uniformly dispersed in a copolymer of about 75 weight percent of butadiene and about 25 weight percent of styrene, the total compositional weight of said particles of said biocidally-active latex being based on 100 weight percent.

9. A biocidally-active, water-insoluble, organic, mass polymer comprised of 0.1 weight percent of (10-phenoxarsinyl)diisopropylphosphonate uniformly dispersed in a quaternary interpolymer composed of about 60 weight percent of styrene, about 18 weight percent of 2-ethylhexyl acrylate, about 9.0 weight percent of glycidyl acrylate and about 13 weight percent of allyl glycidyl ether, the total compositional weight of said biocidally-active mass polymer being based on 100 weight percent.

10. An organic solvent solution of a biocidally-active, water-insoluble, organic polymer comprised of about 47 weight percent of non-volatile solids composed of about 0.1 weight percent of (10-phenoxyarsinyl)diisopropylphosphonate uniformly dispersed in a ternary interpolymer composed of about 60 weight percent of ethyl acrylate, about 30 weight percent of methyl methacrylate and about 10 weight percent of acrylic acid, the total compositional weight of said biocidally-active, organic polymer being based on 100 weight percent.

11. The organic solvent solution of claim 10, wherein said organic solvent is ethanol.

12. A biocidally-active, water-insoluble, organic suspension polymer comprised of about 5 weight percent of 10,10'-oxybisphenoxarsine uniformly dispersed in a ternary interpolymer composed of about 4 weight percent of ethylene dimethacrylate, about 45.5 weight percent of styrene and about 45.5 weight percent of acrylonitrile, the total compositional weight of said biocidally-active suspension polymer being based on 100 weight percent.

13. A polymerization process for the preparation of a biocidally-active, organic ethenoid polymer comprised of heat-reacting an ethenoid monomer-biocide solution composed of (A) from about 0.0001 to about 5 weight percent as based on 100 weight percent of total compositional weight of a biocidally-active, organic, ethenoid monomer-soluble derivative of phenoxarsine selected from the group consisting of 10-chlorophenoxarsine,
10-bromophenoxarsine,
10-methylphenoxarsine,
10-ethylphenoxarsine,
10-propylphenoxarsine,
10-butylphenoxarsine,
10-amylphenoxarsine,
10-phenylphenoxarsine,
10,10'-oxybisphenoxarsine,
(10-phenoxarsinyl)trichloroacetate,
(10-phenoxarsinyl)-n-octylxanthate,
S-(10-phenoxarsinyl)phenoxythiolacetate,
S-(10-phenoxarsinyl)thiolbenzoate,
S-(10-phenoxarsinyl)-4-lauryloxythiolbenzoate,
(10-phenoxarsinyl)diisopropylphosphonate,
(10-phenoxarsinyl)ethylthiolacetate,
S-(10-phenoxarsinyl)-4-methoxythiolbenzoate,
S-(10-phenoxarsinyl)-3,4,5-trimethoxythiolbenzoate,
S-(10-phenoxarsinyl)-4-acetoamidobenzenethiosulfonate,
(10-phenoxarsinyl)methylxanthate,
(10-phenoxarsinyl)ethylxanthate,
(10-phenoxarsinyl)-2-ethoxyethylxanthate,
(10-phenoxarsinyl)-sec.-amylxanthate, and
(10-phenoxarsinyl)tetrahydrofurfurylxanthate, and at least 95 weight percent of (B) at least one polymerizable monomeric olefinically unsaturated compound.

14. The polymerization process of claim 13, wherein said polymerizable, monomeric, olefinically unsaturated compound is selected from the group consisting of (I) alkyl esters of acrylic acid wherein the alkyl is a member of the group consisting of primary and secondary alkyl containing 1–18 carbons; (II) glycidyl esters of monoethylenically unsaturated aliphatic monocarboxylic acids; (III) alkyl esters of methacrylic acid wherein the alkyl is a member of the group consisting of primary and secondary alkyl containing 1–18 carbons; (IV) diesters of alkylenediols with monoethylenically unsaturated aliphatic monocarboxylic acids; (V) acrylonitrile; (VI) methacrylonitrile; (VII) monovinyl aromatic hydrocarbons of the benzene series represented by the formula:

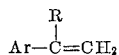

wherein Ar represents a member of the group consisting of aryl and haloaryl and R is a member of the group consisting of hydrogen, $C_1$–$C_4$ alkyl, and halogen having an atomic number of from 17 to 35; (VIII) open-chain aliphatic conjugated dienes having from 4 to 9 carbons; (IX) vinyl esters of organic aliphatic monocarboxylic acids having from 2 to 4 carbons in the acid substituent group; (X) allyl glycidyl ether; (XI) vinyl chloride; (XII) vinylidene chloride; and (XIII) $\alpha,\beta$-monoethylenically unsaturated aliphatic carboxylic acids.

15. An emulsion polymerization process for the preparation of biocidally-active, organic, ethenoid polymers having a total non-volatile solids content of a composition of from about 20 to about 75 weight percent as based on a total non-volatile solids content of 100 weight percent which process comprises (1) preparing a monomer-biocide solution by dissolving a solid crystalline biocide in a liquid ethenoid monomer, said solution being composed essentially of from about 0.0001 to about 5 weight percent as based on the total weight of said monomer-biocide solution of (A) a biocidally-active, organic, ethenoid monomer-soluble derivative of 10-phenoxarsine selected from the group consisting of 10-chlorophenoxarsine,
10-bromophenoxarsine,
10-methylphenoxarsine,
10-ethylphenoxarsine,
10-propylphenoxarsine,
10-butylphenoxarsine,
10-amylphenoxarsine,
10-phenylphenoxarsine,
10,10'-oxybisphenoxarsine,
(10-phenoxarsinyl)trichloroacetate,
(10-phenoxarsinyl)-n-octylxanthate,
S-(10-phenoxarsinyl)phenoxythiolacetate,
S-(10-phenoxarsinyl)thiolbenzoate,
S-(10-phenoxyarsinyl)-4-lauryloxythiolbenzoate,
(10-phenoxarsinyl)diisopropylphosphonate,
(10-phenoxyarsinyl)ethylthiolacetate,
S-(10-phenoxarsinyl)-4-methoxythiolbenzoate,
S-(10-phenoxarsinyl)-3,4,5-trimethoxythiolbenzoate,
S-(10-phenoxarsinyl(-4-acetomamidobenzenethiosulfonate,
(10-phenoxarsinyl)methylxanthate,
10-phenoxarsinyl)ethylxanthate,
(10-phenoxarsinyl)-2-ethoxyethylxanthate,
(10-phenoxarsinyl)-sec.-amylxanthate, and
(10-phenoxarsinyl)tetrahydrofurfurylxanthate, and at least 95 weight percent of (B) at least one polymerizable, monomeric, olefinically unsaturated compound, (2) dissolving a catalyst and an emulsifier in distilled water, (3) heating the polymerization reaction media, (4) incrementally adding said monomer-biocide solution to the heated polymerization reaction media while maintaining the temperautre of the reaction in the range of from about 35° to about 85° C. under autogenous pressure of from about atmospheric pressure to about 150 pounds per square inch of pressure; and (5) continuing the polymerization under reaction condition of (4) until conversion of monomer to polymer is substantially complete.

16. The emulsion polymerization process of claim 15, wherein said polymerizable, monomeric, olefinically unsaturated compound is selected from the group consisting of (I) alkyl esters of acrylic acid wherein the alkyl is a member of the group consisting of primary and secondary alkyl containing 1–18 carbons; (II) glycidyl esters of monoethylenically unsaturated aliphatic monocarboxylic acids; (III) alkyl esters of methacrylic acid wherein the alkyl is a member of the group consisting of primary and secondary alkyl containing 1–18 carbons; (IV) diesters of alkylenediols with monoethylenically unsaturated aliphatic monocarboxylic acids; (V) acrylonitrile; (VI) methacrylonitrile; (VII) monovinyl aromatic hydrocarbons of the benzene series represented by the formula:

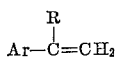

wherein Ar represents a member of the group consisting of aryl and haloaryl and R is a member of the group consisting of hydrogen, $C_1$–$C_4$ alkyl, and halogen having an atomic number of from 17 to 35; (VIII) open-chain aliphatic conjugated dienes having from 4 to 9 carbons; (IX) vinyl esters of organic aliphatic monocarboxylic acids having from 2 to 4 carbons in the acid substituent group; (X) allyl glycidyl ether; (XI) vinyl chloride; (XII) vinylidene chloride; and (XIII) $\alpha,\beta$-monoethylenically unsaturated aliphatic carboxylic acids.

17. The process of claim 15, wherein said biocidally-active, organic, ethenoid monomer-soluble derivate of 10-phenoxarsine is 10,10′-oxybisphenoxarsine.

18. The process of claim 17, wherein said polymerizable, monomeric olefinically unsaturated compound is a mixture composed of about 25 weight percent of copolymerized styrene and about 75 weight percent of copolymerized butadiene, the total compositional weight of the monomeric mixture being based on 100 weight percent.

19. The process of claim 17, wherein said polymerizable, monomeric, olefinically unsaturated compound is a mixture composed of about 4 weight percent of ethylene dimethacrylate, about 45.5 weight percent of styrene and about 45.5 weight percent of acrylonitrile, the total compositional weight of the monomeric mixture being based on 100 weight percent.

20. The process of claim 15, wherein said biocidally-active, organic, ethenoid monomer-soluble derivative of 10-phenoxarsine is (10-phenoxarsinyl)diisopropylphosphonate.

21. The process of claim 20, wherein the polymerizable, monomeric, olefinically unsaturated compound is vinyl acetate.

22. The process of claim 20, wherein said polymerizable, monomeric, olefinically unsaturated compound is a mixture composed of about 60 weight percent of styrene, about 18 weight percent of 2-ethylhexyl acrylate, about 9 weight percent of glycidyl acrylate, and about 13 weight percent of allyl glycidyl ether, the total compositional weight of the monomeric mixture being based on 100 weight percent.

23. The process of claim 20, wherein said polymerizable, monomeric, olefinically unsaturated compound is a mixture composed of about 60 weight percent of ethyl acrylate, about 30 weight percent of methyl methacrylate, and about 10 weight percent of acrylic acid, the total compositional weight of the monomeric mixture being based on 100 weight percent.

24. The process of claim 15, wherein said biocidally-active, organic, ethenoid monomer-soluble derivative of 10-phenoxarsine is 10-phenoxarsinyltrichloroacetate.

25. The process of claim 24, wherein said polymerizable, monomeric, olefinically unsaturated compound is a mixture composed of about 3 weight percent of acrylic acid, about 44 weight percent of isobutyl acrylate, and about 53 weight percent of vinyl acetate, the total compositional weight of the monomeric mixture being based on 100 weight percent.

26. The process of claim 15, wherein said biocidally-active, organic, ethenoid monomer-soluble derivative of 10-phenoxarsine is 10-phenylphenoxarsine.

27. The process of claim 26, wherein said polymerizable, monomeric, olefinically unsaturated compound is a mixture composed of about 49 weight percent of isobutyl acrylate, about 48 weight percent of vinylidene chloride, and about 2 weight percent of acrylic acid, the total composiitonal weight of the monomeric mixture being based on 100 weight percent.

28. The process of claim 15, wherein said biocidally-active, organic, ethenoid monomer-soluble derivative of 10-phenoxarsine is 10-chlorophenoxarsine.

29. The process of claim 28, wherein said polymerizable, monomeric, olefinically unsaturated compound is a mixture composed of about 75 weight percent of butadiene, and about 25 weight percent of styrene, the total compositional weight of the monomeric mixture being based on 100 weight percent.

References Cited by the Examiner
UNITED STATES PATENTS

| | | | |
|---|---|---|---|
| 2,577,041 | 12/1951 | Seymour | 167—42 |
| 2,624,690 | 1/1953 | Leader | 167—42 |
| 2,873,263 | 2/1959 | Lal | 167—42 |
| 2,919,200 | 12/1959 | Dubin et al. | 167—42 |
| 3,036,107 | 5/1962 | Dunbar | 167—33 |
| 3,038,921 | 6/1962 | Strycker et al. | 260—440 |
| 3,069,252 | 12/1962 | Josephs et al. | 167—33 |

FOREIGN PATENTS

| | | |
|---|---|---|
| 592,670 | 9/1947 | Great Britain. |

JULIAN S. LEVITT, *Primary Examiner.*

LEWIS GOTTS, *Examiner.*